United States Patent
Huang et al.

(10) Patent No.: US 8,086,761 B2
(45) Date of Patent: Dec. 27, 2011

(54) SPI CONTROL DEVICE AND METHOD FOR ACCESSING SPI SLAVE DEVICES USING THE SAME

(75) Inventors: Cheng-Wen Huang, Taipei Hsien (TW); Pei-Chao Chen, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 212 days.

(21) Appl. No.: 12/697,343

(22) Filed: Feb. 1, 2010

(65) Prior Publication Data

US 2011/0060856 A1  Mar. 10, 2011

(30) Foreign Application Priority Data

Sep. 9, 2009  (CN) .......................... 2009 1 0306816

(51) Int. Cl.
*G06F 3/00* (2006.01)

(52) U.S. Cl. .......................................... 710/10; 710/305

(58) Field of Classification Search .......... 710/104–105, 710/110, 305, 10

See application file for complete search history.

(56) References Cited

U.S. PATENT DOCUMENTS 7,228,372 B2 * 6/2007 Yoshimura et al. ........... 710/110
7,668,271 B2 * 2/2010 Kim et al. ..................... 375/354

* cited by examiner

*Primary Examiner* — Clifford Knoll
(74) *Attorney, Agent, or Firm* — Altis Law Group, Inc.

(57) ABSTRACT

A method for accessing serial peripheral interface (SPI) slave devices using an SPI control device determines an SPI slave device to be operated, sets an operation type of the determined SPI slave device, and further sets a clock rate, a clock phase, and a clock polarity of the determined SPI slave device. The method further generates a clock signal according to the clock rate, the clock phase, and the clock polarity of the determined SPI slave device, and performs a read operation or a write operation on the determined SPI slave device according to the clock signal.

9 Claims, 6 Drawing Sheets

SPI CONTROL DEVICE AND METHOD FOR ACCESSING SPI SLAVE DEVICES USING THE SAME

BACKGROUND

1. Technical Field

Embodiments of the present disclosure relate to data accessing technology, and particularly to a serial peripheral interface (SPI) control device and method for accessing SPI slave devices using the SPI control device.

2. Description of Related Art

Current processors generally connect with a plurality of serial peripheral interface (SPI) slave devices directly. If a new SPI slave device is connected to a processor, a new interface of the processor needs to be allocated for the new SPI slave device. However, there are a limited number of interfaces, and the cost of adding a new interface is expensive.

Furthermore, different SPI slave devices may have different clock rates, different clock phases, and different clock polarities. Thus, the processor has to generate different clock signals to access different SPI slave devices. It is time-consuming for the processor to generate different clock signals. Therefore, a prompt and efficient method for accessing SPI slave devices is desirable.

DETAILED DESCRIPTION

Figure 1:
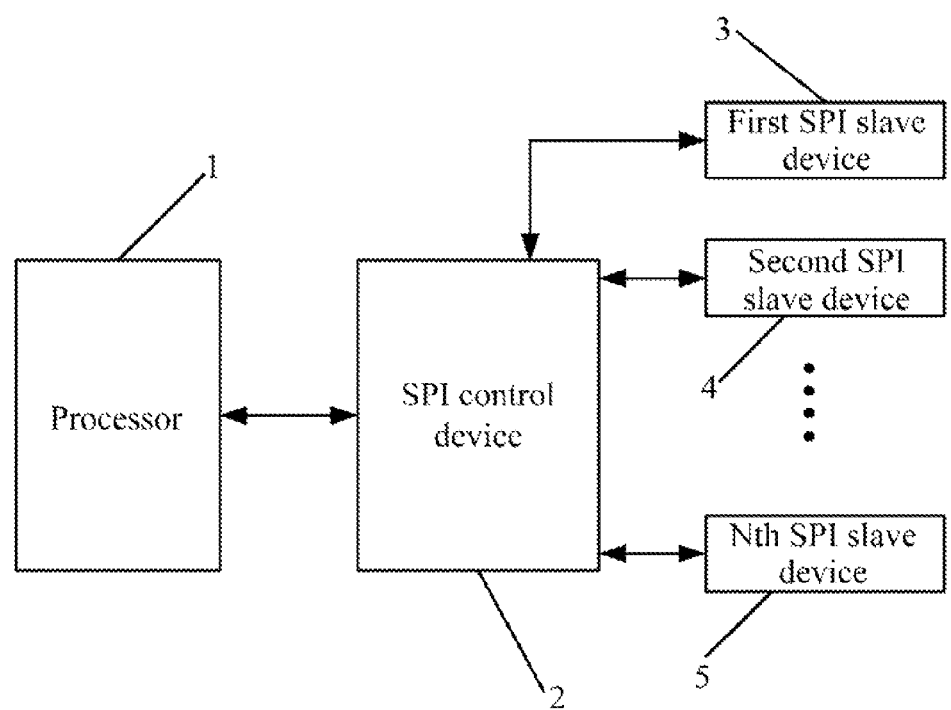
FIG. 1 is a block diagram of one embodiment of an SPI control device in communication with SPI slave devices.

FIG. 1 is a block diagram of one embodiment of an SPI control device 2 in communication with a plurality of SPI slave devices. The SPI control device 2 is connected to a processor 1, and further connected to the plurality of SPI slave devices. In one embodiment, the plurality of SPI slave devices may include a first SPI slave device 3, a second SPI slave device 4, and an Nth SPI slave device 5. The SPI control device 2 may be used to receive a read command or a write command sent from the processor 1 for accessing an SPI slave device (e.g., the first SPI slave device 3), generate a clock signal to access the SPI slave device, perform a read operation or a write operation on the SPI slave device according to the clock signal, and return a read result or a write result to the processor 1. Detailed descriptions of a structure of the SPI control device 2 will be provided in FIG. 2. In one embodiment, a number of the plurality of SPI slave devices is less than or equal to 16.

Figure 2:
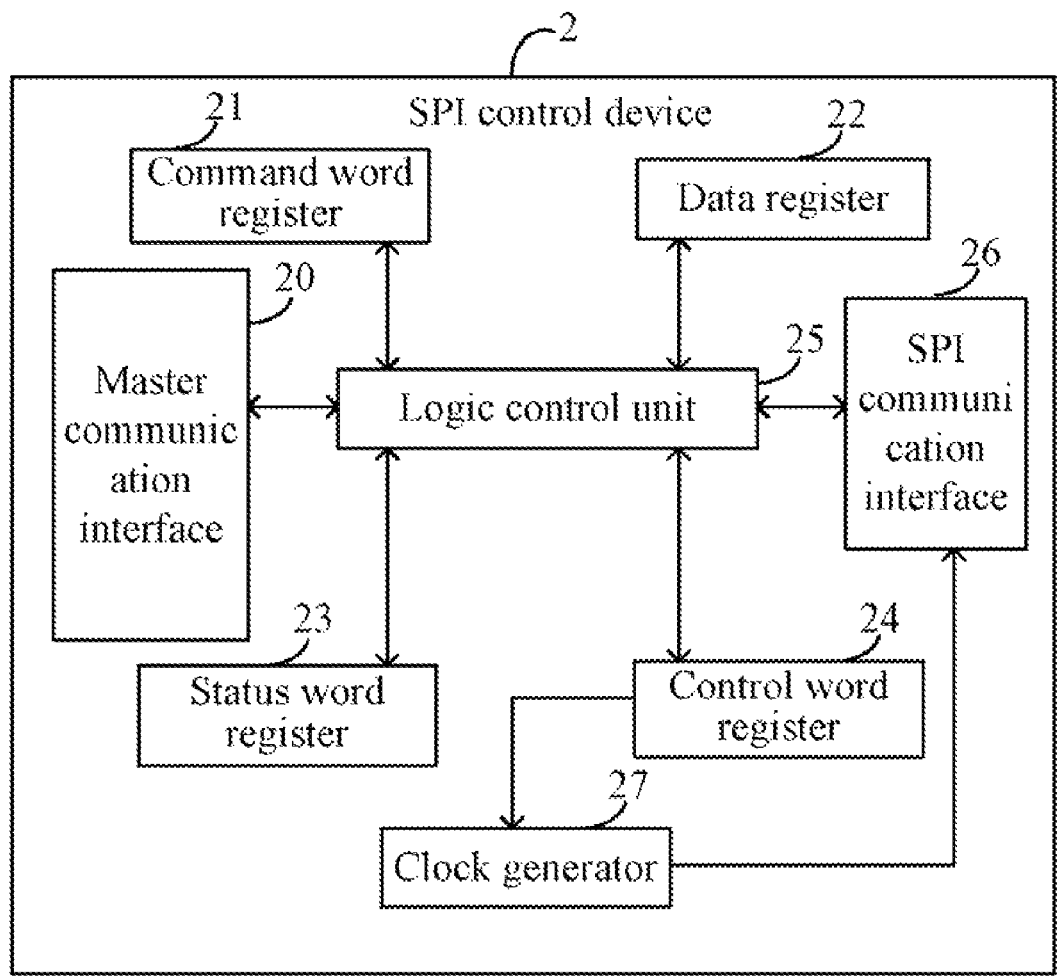
FIG. 2 is a block diagram of one embodiment of the SPI control device in FIG. 1.

FIG. 2 is a block diagram of one embodiment of the SPI control device 2 in FIG. 1. In one embodiment, the SPI control device 2 may include a master communication interface 20, a command word register 21, a data register 22, a status word register 23, a control word register 24, a logic control unit 25, an SPI communication interface 26, and a clock generator 27. The logic control unit 25 is electrically connected to the master communication interface 20, the command word register 21, the data register 22, the status word register 23, the control word register 24, and the SPI communication interface 26. The clock generator 27 is electrically connected to the control word register 24 and the SPI communication interface 36. In one embodiment, the SPI control device 2 may be a field programmable gate array (FPGA), for example.

In one embodiment, the master communication interface 20 may be used to connect the SPI control device 2 to the processor 1, to provide a communication interface between the SPI control device 2 and the processor 1.

In one embodiment, the SPI communication interface 26 may be used to connect the SPI control device 2 to the plurality of SPI slave device, to provide a communication interface between the SPI control device 2 and the plurality of SPI slave devices.

The command word register 21 may be used to determine an SPI slave device to be operated (hereinafter referred to as "the determined SPI slave device"), and set an operation type of the determined SPI slave device. The operation type may include a read operation and a write operation, for example. An example of a structure of the command word register 21 is shown in Table. 1.

TABLE 1

| Bit0 | bit1 | bit2 | bit3 | bit4 | bit5 | bit6 | bit7 |
| --- | --- | --- | --- | --- | --- | --- | --- |

In Table. 1, "bit0" represents the operation type of accessing the determined SPI slave device. For example, the operation type is the read operation if bit0=0, or the operation type is the write operation if bit0=1. In one embodiment, "bit1-bit7" represents an address of the determined SPI slave device. For example, the first SPI slave device 3 is the determined SPI slave device if bit1-bit7=0000000. A detailed description is shown in Table. 2.

TABLE 2

| Address of the SPI slave device | SPI slave device to be operated |
| --- | --- |
| 0000000 | SPI slave device 1 |
| 0000001 | SPI slave device 2 |
| 0000010 | SPI slave device 3 |
| 0000011 | SPI slave device 4 |
| 0000100 | SPI slave device 5 |
| 0000101 | SPI slave device 6 |
| 0000110 | SPI slave device 7 |
| 0000111 | SPI slave device 8 |
| ... | ... |

The data register 22 may be used to store data to be operated. For example, the data register 22 stores data obtained from the determined SPI slave device when the read operation is performed, or stores data written in the determined SPI slave device when the write operation is performed.

In one embodiment, the status word register 23 may be used to record an operation flag so as to determine if a read cycle or a write cycle is completed. An example of a structure of the status word register 23 is shown in Table. 3.

TABLE 3

| Bit0 | bit1 | bit2 | bit3 | bit4 | bit5 | bit6 | bit7 |
| --- | --- | --- | --- | --- | --- | --- | --- |

In Table. 3, "bit0" may be used to record the operation flag, so as to determine if the read cycle or the write cycle is completed. For example, a value of "bit0" is recorded as 1 if the read cycle or the write cycle is completed, otherwise, the value of "bit0" is recorded as 0 if the read cycle or the write cycle is not completed. In one embodiment, "bit1-bit7" may be defined according to actual requirements.

In one embodiment, the control word register 24 may be used to set a clock rate, a clock phase, and a clock polarity of the determined SPI slave device. An example of a structure of the control word register 24 is shown in Table. 4.

TABLE 4

| Bit0 | bit1 | bit2 | bit3 | bit4 | bit5 | bit6 | bit7 |
|------|------|------|------|------|------|------|------|

In Table. 4, "bit0" may be used to record the clock rate of the determined SPI slave device. For example, the clock rate of the determined SPI slave device is equal to 1.024 MHz if bit0=0, or the clock rate of the determined SPI slave device is equal to 8.192 MHz if bit0=1. In one embodiment, "bit1" may be used to record the clock phase of the determined SPI slave device. For example, a trigger mode of the determined SPI slave device is chosen as a rising edge if bit0=0, or the trigger mode of the determined SPI slave device is chosen as a falling edge if bit0=1. In one embodiment, "bit2" may be used to record the clock polarity of the determined SPI slave device. For example, the clock polarity of the determined SPI slave device is chosen as a high level if bit0=0, or the clock polarity of the determined SPI slave device is chosen as a low level if bit0=1. In one embodiment, "bit3-bit7" may be defined according to actual requirements.

In one embodiment, the clock generator 27 may be used to generate a clock signal according to the clock rate, the clock phase, and the clock polarity of the determined SPI slave device. If the clock rate of the determined SPI slave device is 1.024 MHz, the clock generator 27 may divide a clock rate of 8.192 MHz by eight.

The logic control unit 25 receives a read command or a write command sent from the processor 1 through the master communication interface 20, and controls the SPI control device 2 to perform the read operation or the write operation on the determined SPI slave device. Detailed descriptions are provided below.

Firstly, the logic control unit 25 initializes the command word register 21 when a read command or a write command is received from the processor 1, and determines an SPI slave device to be operated and an operation type of the determined SPI slave device. The operation type may include a read operation and a write operation. For example, the logic control unit 25 initializes the command word register 21 as "00000000." Thus, the first SPI slave device 3 is the determined SPI slave device, and the operation type is the read operation.

Secondly, the logic control unit 25 initializes the control word register 24, and sets a clock rate, a clock phase, and a clock polarity of the determined SPI slave device. For example, the logic control unit 25 initializes the control word register 24 as "00000000" (refers to Table. 4).

Thirdly, the logic control unit 25 controls the clock generator 27 to generate a clock signal according to the clock rate, the clock phase, and the clock polarity of the determined SPI slave device.

Fourthly, the logic control unit 25 control the SPI communication interface 26 to perform the read operation or the write operation on the determined SPI slave device according to the clock signal.

Figure 3:
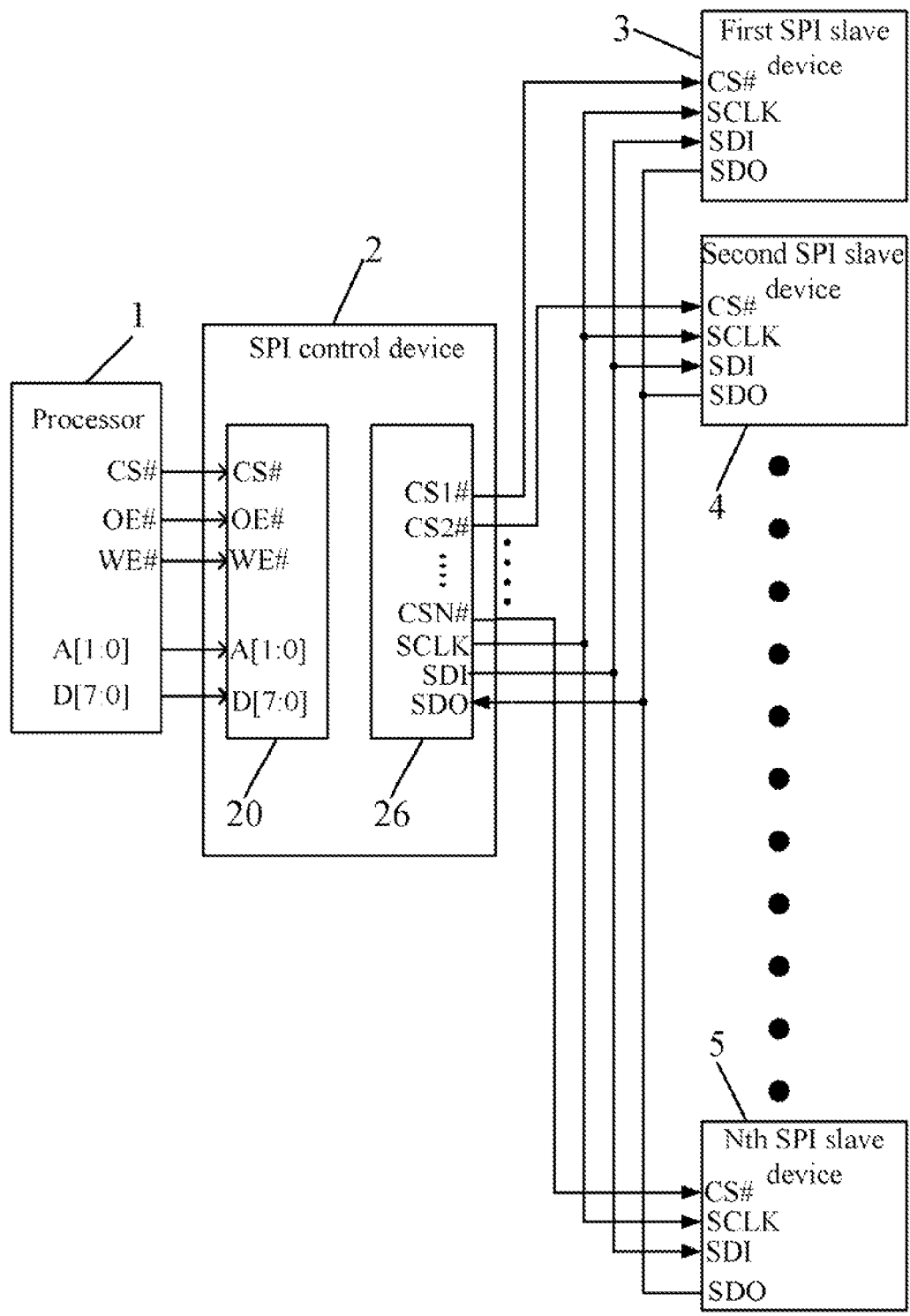
FIG. 3 is a circuit diagram of one embodiment of the SPI control device in FIG. 1.

FIG. 3 is a circuit diagram of one embodiment of the SPI control device 2 in FIG. 1.

In one embodiment, the master communication interface 20 may include signal ports of CS#, OE#, WE#, A[1:0], and D[7:0]. The signal port of CS# may be used to output a chip selection signal. For example, if the signal port of CS# outputs an effective signal (e.g., a high level signal), the SPI control device 2 is activated.

In one embodiment, if the signal port of OE# outputs the effective signal, the SPI control device 2 may send data to the processor 1. If the signal port of WE# outputs the effective signal, the SPI control device 2 may receive data sent from the processor 1.

In one embodiment, the signal port of A[1:0] sets a register to be initialized. For example, the command word register 21 is initialized if A[1:0]=00. A detailed description is shown in Table. 5.

TABLE 5

| A[1:0] | 00 | 01 | 10 | 11 |
|--------|-----|-----|-----|-----|
| Register to be initialized | Command word register 21 | Status word register 23 | Control word register 24 | Data register 22 |

In one embodiment, the signal port of D[7:0] transfers data between the processor 1 and the SPI control device 2. In one embodiment, the signal port of D[7:0] uses a data bus of eight bits.

In one embodiment, the SPI communication interface 26 connects the SPI control device 2 with the plurality of SPI slave device. Referring to FIG. 3, the SPI communication interface 26 includes signal ports of CS1#-CSN#, a clock signal port SCLK, a data input port SDI, and a data output port SDO. In one embodiment, each of the signal ports of CS1#-CSN# connects with a corresponding SPI slave device. For example, the signal port of CS1# connects with the first SPI slave device 3, . . . and the signal port of CSN# connects with the Nth SPI slave device 5. Furthermore, the clock signal port SCLK connects with a corresponding clock port SCLK at each of the plurality of the SPI slave devices, the data input port SDI connects with a corresponding data input port SDI at each of the plurality of the SPI slave device, and the data output port SDO connects with a corresponding data output port SDO at each of the plurality of the SPI slave device.

Figure 4:
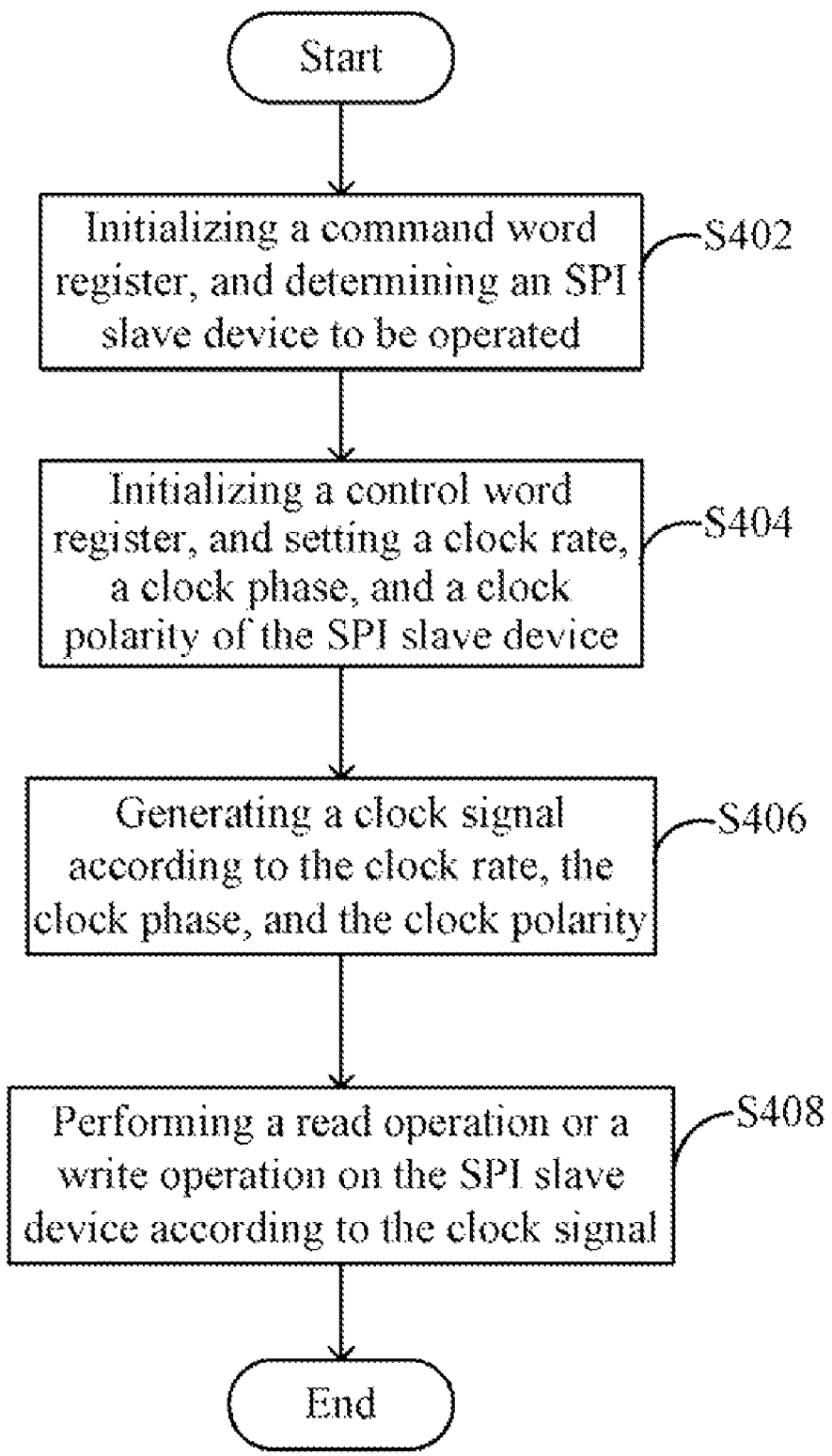
FIG. 4 is a flowchart of one embodiment of a method for accessing SPI slave devices using the SPI control device in FIG. 1.

FIG. 4 is a flowchart of one embodiment of a method for accessing SPI slave devices using the SPI control device in FIG. 1. Depending on the embodiment, additional blocks may be added, others removed, and the ordering of the blocks may be changed.

In block S402, the logic control unit 25 initializes the command word register 21 when a read command or a write command is received from the processor 1, determines an SPI slave device to be operated, and sets an operation type of the determined SPI slave device. The operation type may include a read operation and a write operation.

In block S404, the logic control unit 25 initializes the control word register 24, and sets a clock rate, a clock phase, and a clock polarity of the determined SPI slave device.

In block S406, the logic control unit 25 control the clock generator 27 to generate a clock signal according to the clock rate, the clock phase, and the clock polarity of the determined SPI slave device.

In block S408, the logic control unit 25 control the SPI communication interface 26 to perform the read operation or the write operation on the determined SPI slave device according to the clock signal. A detailed description refer to FIG. 5 and FIG. 6.

Figure 5:
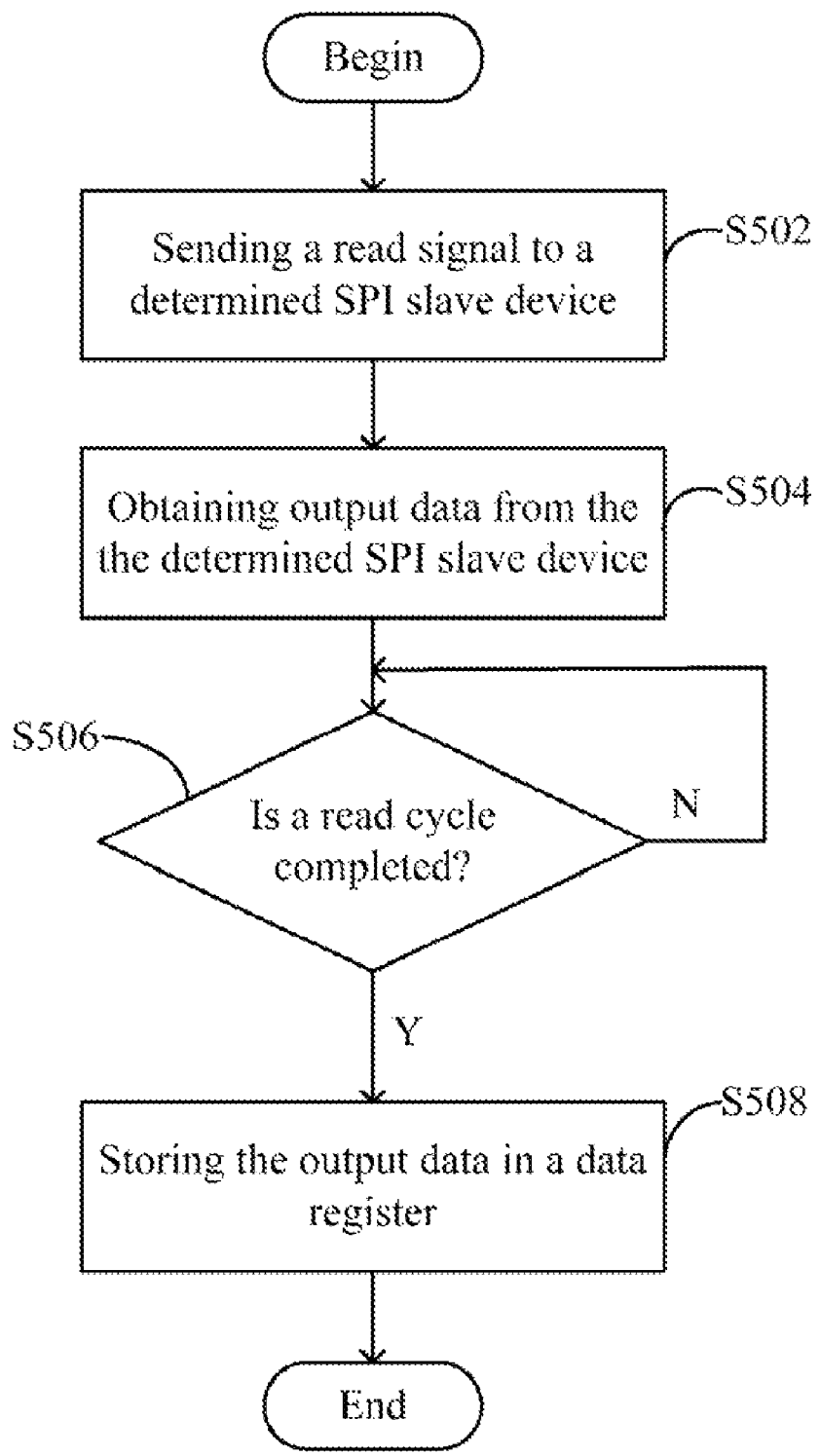
FIG. 5 is a detailed flowchart of one embodiment of performing a read operation on the determined SPI slave device.

FIG. 5 is a detailed flowchart of one embodiment performing a read operation on the determined SPI slave device. Depending on the embodiment, additional blocks may be added, others removed, and the ordering of the blocks may be changed.

In block S502, the logic control unit 25 sends a read signal to the determined SPI slave device through the SPI communication interface 26.

In block S504, the logic control unit 25 obtains output data from the determined SPI slave device through the SPI communication interface 26.

In block S506, the logic control unit 25 determining if a read cycle is completed according to a value of "bit0" in the status word register 23 (refers to Table. 3). The procedure then goes to block S508 if the read cycle is completed, or repeating block S506 if the read cycle is not completed.

In block S508, the logic control unit 25 stores the output data in the data register 22 of the SPI control device 2. Then, the processor 1 may read the output data stored in the data register 22 through the master communication interface 20.

Figure 6:
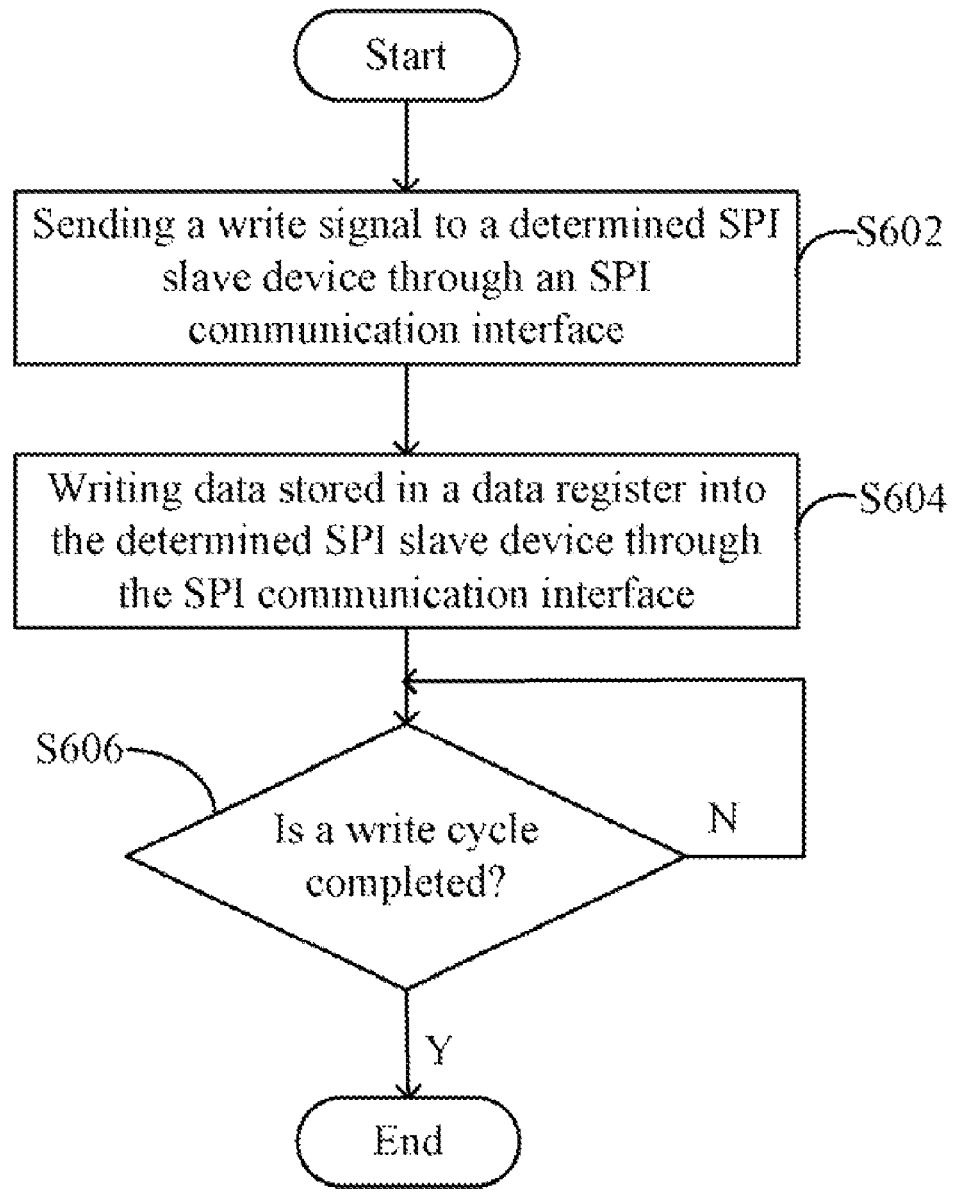
FIG. 6 is a detailed flowchart of one embodiment of performing a write operation on the determined SPI slave device.

FIG. 6 is a detailed flowchart of one embodiment performing a write operation on the determined SPI slave device. Depending on the embodiment, additional blocks may be added, others removed, and the ordering of the blocks may be changed.

In block S602, the logic control unit 25 sends a write signal to the determined SPI slave device through the SPI communication interface 26.

In block S604, the logic control unit 25 writes data stored in a data register 22 of the SPI control device 2 into the determined SPI slave device through the SPI communication interface 26.

In block S606, the logic control unit 25 determines if a write cycle is completed according to the value of "bit0" in the status word register 23 (refers to Table. 3). The procedure ends if the write cycle is completed, or repeating block S606 if the write cycle is not completed.

It should be emphasized that the above-described embodiments of the present disclosure, particularly, any embodiments, are merely possible examples of the implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. A serial peripheral interface (SPI) control device, the SPI control device in communication with a processor and a plurality of SPI slave devices, the SPI control device comprising:
    an SPI communication interface operable to connect the SPI control device with the plurality of SPI slave device;
    a command word register operable to determine an SPI slave device to be operated, and set an operation type of the determined SPI slave device, the operation type comprising a read operation and a write operation;
    a control word register operable to set a clock rate, a clock phase, and a clock polarity of the determined SPI slave device;
    a clock generator operable to generate a clock signal according to the clock rate, the clock phase, and the clock polarity of the determined SPI slave device; and
    a logic control unit operable to perform the read operation or the write operation on the determined SPI slave device according to the clock signal through the SPI communication interface.

2. The SPI control device according to claim 1, further comprising a master communication interface operable to connect the SPI control device with the processor.

3. The SPI control device according to claim 1, further comprising a status word register operable to record an operation flag to determine if a read cycle or a write cycle on the determined SPI slave device is completed.

4. The SPI control device according to claim 1, further comprising a data register operable to store data obtained from the determined SPI slave device when the read operation is performed.

5. The SPI control device according to claim 4, wherein the data register is further operable to store data written in the determined SPI slave device when the write operation is performed.

6. A method for accessing serial peripheral interface (SPI) slave devices, comprising:
    (a) providing an SPI control device, the SPI control device connecting with a plurality of SPI slave devices through an SPI communication interface, and further connecting with a processor through a master communication interface;
    (b) determining an SPI slave device to be operated, and setting an operation type of the determined SPI slave device, the operation type comprising a read operation and a write operation;
    (c) setting a clock rate, a clock phase, and a clock polarity of the determined SPI slave device;
    (d) generating a clock signal according to the clock rate, the clock phase, and the clock polarity of the determined SPI slave device; and
    (e) performing the read operation or the write operation on the determined SPI slave device according to the clock signal through the SPI communication interface.

7. The method according to claim 6, wherein performing the read operation on the determined SPI slave device comprises:
    (e11) sending a read signal to the determined SPI slave device through the SPI communication interface;
    (e12) obtaining output data from the determined SPI slave device;
    (e13) determining if a read cycle is completed; and
    (e14) storing the output data in a data register of the SPI control device if the read cycle is completed.

8. The method according to claim 7, further comprising:
    reading the output data stored in the data register of the SPI control device by the processor through the master communication interface.

9. The method according to claim 6, wherein performing the write operation on the determined SPI slave device comprises:
    (e21) sending a write signal to the determined SPI slave device through the SPI communication interface;
    (e22) writing data stored in a data register of the SPI control device into the determined SPI slave device through the SPI communication interface; and
    (e23) determining if a write cycle is completed, and the procedure ending if the write cycle is completed, or repeating block (e23) if the write cycle is not completed.

* * * * *